W. H. Peirce.
Egg-Beaters.
Nº 75787         Patented Mar. 24, 1868
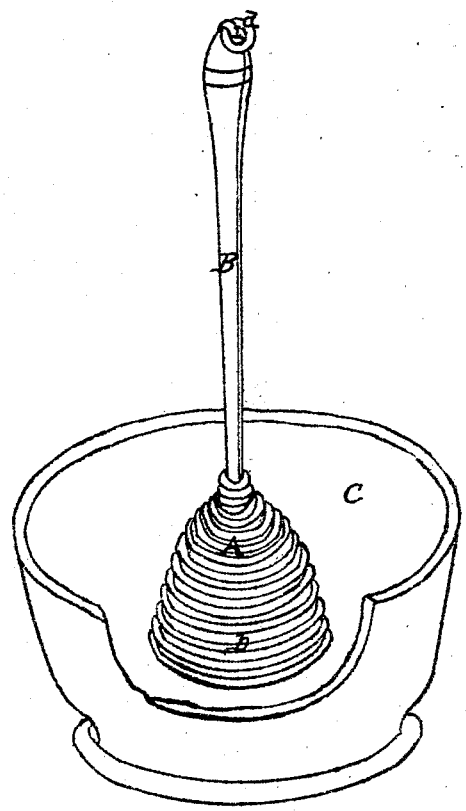
Witnesses
Samuel Darling
H. K. Porter
Inventor
Wm H. Pierce
By T W. Porter
His Atty

United States Patent Office.

WILLIAM H. PEIRCE, OF BANGOR, MAINE.

Letters Patent No. 75,787, dated March 24, 1868.

IMPROVED EGG-BEATER.

*The Schedule referred to in these Letters Patent and making part of the same.*

TO ALL WHOM IT MAY CONCERN:

Be it known that I, WILLIAM H. PEIRCE, of Bangor, in the county of Penobscot, and State of Maine, have invented a new and useful Egg-Beater; and I do hereby declare that the following is a full, clear, and exact description of its construction and operation, reference being had to the drawings accompanying this specification, which drawings represent my invention in perspective, as being used in a bowl, a part of which is broken away to show the beater.

The nature of my invention consists in an egg-beater, formed of wire, bent or coiled spirally in the form of a bell, to the apex of which a handle is attached for convenience of using.

To enable others skilled in the art to make and use my invention, I will proceed to describe its construction and operation.

In the drawings, A represents the coiled, spiral, bell-shaped portion of the beater, which I usually form of tinned wire, to prevent corrosion. This bell-shaped part may be made of any required size or form, and the lower end of the wire forming the bell, I solder to the next wire above it. B is the handle, usually made of wood, and inserted firmly in the upper coils of the bell-part A. *a* is a ring, secured to the handle B, for the purpose of hanging up the beater when not in use. C is the bowl, in the bottom of which the broken egg *b* is dropped, to beat which, the beater is placed in the position shown, when, by means of handle B, the bell-portion is rapidly raised and depressed. At each depression, all the coils below the lower end of the handle are brought flat upon the bottom of the bowl, the coils shutting or closing one within the other, and the egg is rapidly forced out between them, and, upon the elevation of the wires to their former shape, the egg returns to its former position in the centre of the bowl. Thus, by the constant and active rushing in and out of the egg between the coils, as well as the direct downward action of the beater, it is rapidly and with ease reduced to that foamy condition which all good cooks aspire to.

Among the merits of my invention are these: it is less expensive than any other, easier to cleanse after using, less liable to get out of repair, and in effectiveness, both in time and results, is equal to any other.

What I claim as new, and desire to secure by Letters Patent, is—

An egg-beater, constructed of a cone of coiled wire, left free to move vertically as a spring, substantially in manner as described and shown.

WM. H. PEIRCE.

Witnesses:
   H. L. MITCHELL,
   JOHN L. ROBINSON.